No. 721,973. PATENTED MAR. 3, 1903.
S. A. SMITH.
AUTOMATIC MIXER FOR FLUIDS.
APPLICATION FILED MAY 18, 1901.
NO MODEL.

WITNESSES:
Chas. H. Luther Jr.
Ada E. Hagerty.

INVENTOR:
Scott A. Smith
by Joseph A. Miller & Co.
ATTORNEYS.

UNITED STATES PATENT OFFICE.

SCOTT A. SMITH, OF PROVIDENCE, RHODE ISLAND.

AUTOMATIC MIXER FOR FLUIDS.

SPECIFICATION forming part of Letters Patent No. 721,973, dated March 3, 1903.

Application filed May 18, 1901. Serial No. 60,957. (No model.)

*To all whom it may concern:*

Be it known that I, SCOTT A. SMITH, a citizen of the United States, residing at Providence, in the county of Providence and State of Rhode Island, have invented a new and useful Improvement in Automatic Mixers for Fluids, of which the following is a specification.

This invention has reference to a device for agitating and mixing liquids automatically as the liquid flows from one receptacle to the other.

The invention consists in the peculiar and novel construction and combination whereby the liquid is agitated and mixed in its passage through a conduit or pipe.

When two fluids are to be mixed or matter is to be incorporated with a liquid or liquids, agitation of the compound is required to secure a thorough mixture. The mixing of oil and water, essential oils with spirits, vinegar with olive-oil for dressing, the mixture of heavy oils with lighter oils, and other admixtures—such as the mixing of lime or powdered charcoal with fluids, or other mixtures of fluids with fluids, or fluids with matter having little or no affinities—require long and constant agitation to secure the thorough mixing, particularly when large quantities are to be treated.

The object of this invention is to facilitate the process, and to this end I operate upon small quantities of the fluids as the same pass from one receptacle to the other.

Figure 1:
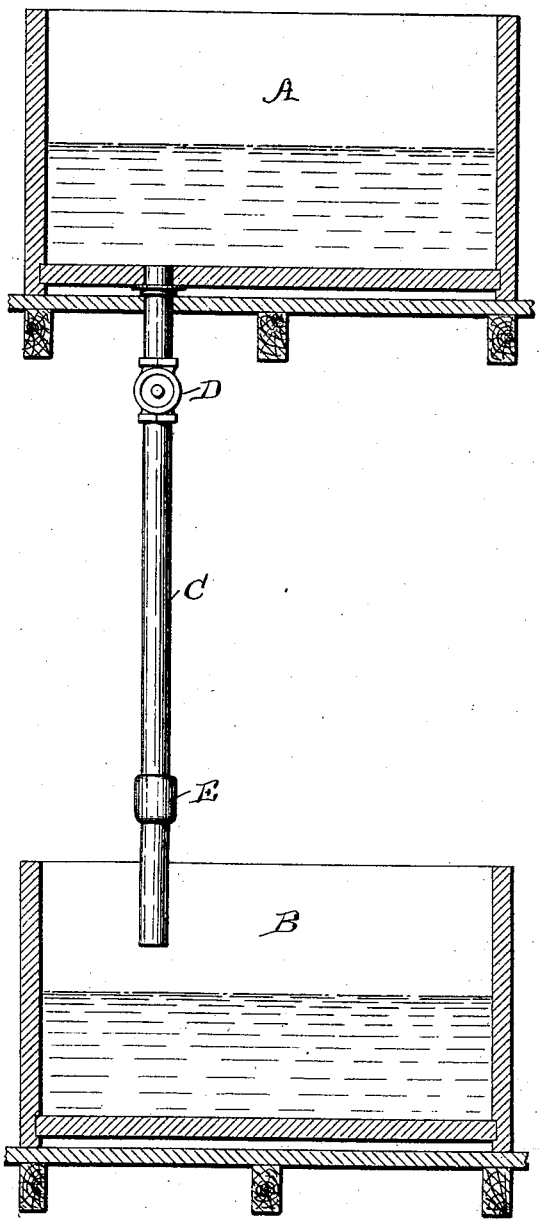
Figure 2:
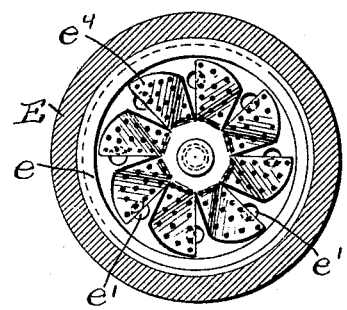
Figure 3:
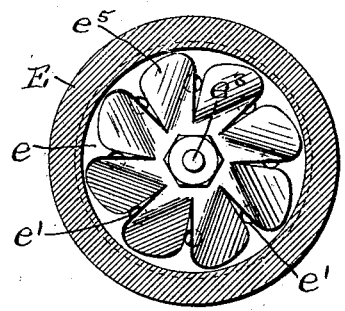
Figure 4:
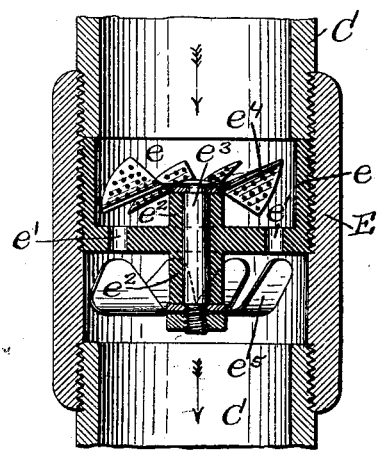

Figure 1 is a sectional view of two receptacles connected by a pipe. Fig. 2 is a transverse sectional view of the pipe, showing one end of the mixing and agitating wheel. Fig. 3 is a view of the other agitating and mixing wheel. Fig. 4 is a longitudinal sectional view of a coupling connecting the two ends of a pipe, showing the mixing and agitating device.

In the drawings, A indicates an elevated tank; B, a lower tank; C, a pipe connecting the tank A with the tank B; D, a stop-cock in the pipe, and E a coupling or part containing the mixing device.

In the preferred form I use a pipe C of suitable diameter and connect the same with an elevated tank A at one end, place a stop-cock at a convenient point into the pipe, and then carry the pipe as direct as circumstances will permit to a lower receiving-tank B. At a convenient point in the pipe C, I insert the coupling E, in which is secured the cup $e$, the bottom of which is perforated with the holes $e'$ $e'$, preferably oblique to the plane of the bottom. Bosses $e^2$ extend from each side of the center of the bottom, which bosses are bored through to form the journal-bearing for the shaft $e^3$. On one end of the shaft $e^3$ the agitator-wheel $e^4$, having preferably perforated blades, is secured, and to the other end the impact actuator or propeller wheel $e^5$, having the blades shaped to receive the impact of the fluid discharged from the holes $e'$ $e'$ in the bottom of the cup $e$.

By preference I make the agitator or mixer $e^4$ of less area or less resistance than the actuator-wheel, and in the present construction this is accomplished by having the former of less diameter than the latter and also by having the agitator-blades perforated and made somewhat smaller than the blades of the actuator.

I do not wish to confine myself to the exact construction of the mixing device or to the connection by the pipe C with the tanks A and B, because a suitable mixing device operated by the flow of the liquid, whether caused by gravity or other means, will act on the portion of the liquid flowing through the mixing device.

I do not wish to limit myself to any relative proportions of the pipe C to the tank or reservoir; but I prefer that the pipe and the mixing device should be of moderate size and that two or more pipes be used when large quantities are to be treated, so as to confine the agitation and mixing to small quantities.

By the use of my automatic mixer the flow of the liquid through the pipe acts on the blades of the wheels $e^4$ and $e^5$ to rotate the same. The liquid is thereby beaten and churned by the blades of the wheels and thoroughly mixed in its passage from one tank or receptacle to the other.

In the preferred form the flow of the liquid is reduced materially by the bottom of the cup $e$ closing the greater part of the area of the pipe or conduit. The liquid discharged from the holes $e'$ $e'$ impinges on the blades of the actuator-wheel $e^5$ and is dispersed in a spray, thereby causing the wheel to rotate and also thoroughly mixing the liquid. The rotation of the wheel $e^5$ is transmitted to the agitator-wheel $e^4$, which acting on the retarded liquid agitates and mixes the same within the cup $e$ and before the liquid can pass through the holes $e'$ $e'$. The perforations in the blades of the wheel $e^4$ materially aid in the mixing of the fluid.

Having thus described my invention, I claim as new and desire to secure by Letters Patent—

1. The combination of a conduit through which the fluid flows, a rotary propeller-wheel located within said conduit in the path of the fluid and actuated by the movement of the fluid, an agitator or mixer also located within the said conduit in the path of the fluid and in advance of said propeller-wheel and connected with and actuatated by the said propeller, and the said agitator being of less area or offering less resistance to the fluid than the propeller, substantially as and for the purpose set forth.

2. The combination of a conduit through which the fluid flows, a rotary propeller-wheel having imperforate blades and located within said conduit in the path of the fluid and actuated by the movement of such fluid, an agitator or mixer wheel having perforated blades and located within said conduit in the path of the fluid in advance of said propeller and connected with and actuated by said propeller-wheel, substantially as and for the purpose set forth.

3. The combination of a conduit through which the fluid flows, a perforated partition arranged within said conduit, a rotary propeller located within said conduit and upon the side of the partition where the fluid is discharged and adapted to receive the impact of the jets of fluid discharged from the perforations in said partition for actuating the propeller, an agitator or mixer connected with and operated by said propeller, substantially as and for the purpose set forth.

4. The combination of a conduit through which the fluid flows, a perforated partition arranged within said conduit, a rotary propeller located within said conduit and upon the side of the partition where the fluid is discharged and adapted to receive the impact of the jets of fluid discharged from the perforations in said partition for actuating the propeller, an agitator or mixer connected with and operated by said propeller, the said propeller being located upon the opposite side of the partition from the agitator, substantially as and for the purpose set forth.

5. The combination of a conduit through which the fluid flows, a perforated partition fixed across the interior of the conduit, a rotary shaft mounted through said partition so as to project from each side thereof, a propeller-wheel mounted upon one end of said shaft upon one side of said partition and adapted to receive the jets of water passing through the perforations in said partition to actuate the propeller, an agitator-wheel mounted upon the other end of said shaft upon the opposite side of said partition and actuated by said propeller, substantially as and for the purpose set forth.

In testimony whereof I have signed my name to this specification in the presence of two subscribing witnesses.

SCOTT A. SMITH.

Witnesses:
A. E. HAGERTY,
J. A. MILLER, Jr.